United States Patent

[11] 3,608,062

| [72] | Inventors | Franz Alfes<br>Krefeld;<br>Wolfgang Behrenz, Cologne-Stammheim;<br>Karl Raichle, Krefeld-Bochum; Kurt<br>Weirauch, Krefeld, all of Germany |
|------|-----------|---|
| [21] | Appl. No. | 784,488 |
| [22] | Filed | Dec. 17, 1968 |
| [45] | Patented | Sept. 21, 1971 |
| [73] | Assignee | Farbenfabriken Bayer Aktiengesellschaft<br>Leverkusen, Germany |
| [32] | Priority | Jan. 16, 1968 |
| [33] | | Germany |
| [31] | | P 16 94 240.8 |

[54] SHAPED ARTICLES WITH LONG-TERM VAPOUR EMISSION
9 Claims, No Drawings

[52] U.S. Cl. ...................... 424/22,
424/78, 424/219, 43/131, 239/6, 239/60
[51] Int. Cl. ...................... A61k 24/12
[50] Field of Search ...................... 424/78,
219, 22; 43/131, 239/60, 6

[56] References Cited
UNITED STATES PATENTS

| 2,956,366 | 10/1960 | Wiesmann .................... | 43/131 |
|-----------|---------|-----------------------------|--------|
| 3,169,705 | 2/1965 | Geiger ........................ | 239/43 |
| 3,173,223 | 3/1965 | Dunn et al. ................. | 43/131 |
| 3,279,118 | 10/1966 | Allen ......................... | 43/129 |
| 3,310,235 | 3/1967 | Zbinden ...................... | 239/6 |
| 3,318,769 | 5/1967 | Folckemer et al. ........... | 424/78 |
| 3,364,105 | 1/1968 | Geiger et al. ................ | 424/358 X |
| 3,470,293 | 9/1969 | Geiger ........................ | 424/84 |

OTHER REFERENCES

Miles et al. J. AGR. Food. Chem. 10: 240–244 (1962) "Stable Formulations For Sustained Release of DDVP"

*Primary Examiner*—Shep K. Rose
*Attorney*—Burgess, Dinklage & Sprung

ABSTRACT: Shaped articles having long term vapor emission comprising a thermosetting resin produced from an unsaturated polyester and a vinyl monomer copolymerizable therewith, containing an effective amount of 0,0-dimethyl-0-(2,2-dichlorovinyl)-phosphoric acid ester as pesticidally, e.g. insecticidally and/or acaricidally, active compound, in a ratio by weight of active compound to resin of e.g. about 0.25–2 : 1, and also containing a solid filler, and optionally a liquid filler.

SHAPED ARTICLES WITH LONG-TERM VAPOUR EMISSION

The present invention relates to and has for its objects the provision for particular new shaped articles containing 0,0-dimethyl-0-(2,2-dichlorovinyl)-phosphoric acid ester, in the form of thermosetting resins produced from unsaturated polyesters and vinyl compounds copolymerizable therewith, and having a long term vapor emission, and methods for producing such shaped articles in a simple manner and for using such shaped articles to combat pests, especially insects and acarids, with other and further objects becoming apparent from a study of the within specification and accompanying examples. These shaped articles in accordance with the present invention possess the property of giving off the active compound, hereinafter briefly called DDVP, to the surrounding atmosphere for a long time, for example, several months, in an insecticidally and acaricidally effective amount.

DDVP of the structural formula

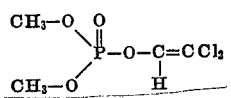

has long been known as a pesticidally active compound with insecticidal and acaricidal effect (G. Schrader: "Die Entwicklung neuer insektizider Phosphorsäureester," 3rd edition, Verlag Chemie, Weinheim, Bergstrasse). Like most insecticides, DDVP acts as a contact as well as a stomach and respiratory poison. Since the compound possesses even at room temperature a high vapor pressure (20° C.=$1.2\times10^{-2}$ mm. hg.) in comparison with other insecticides, its effect as a respiratory poison is particularly noteworthy. The compound is therefore used in automatic spraying devices as an aerosol for the control of noxious insects and spiders.

Advantageous for this purpose though its high volatility is, such high volatility hinders the attainment of an adequate lasting effect. The DDVP volatilizes and disperses from a room so rapidly that the room can, only 1 to 2 hours after application of the active compound, be again infested with vermin without the latter being killed. A further disadvantage of DDVP lies in that it hydrolyzes comparatively rapidly and this impairs its lasting effect as a respiratory poison.

Numerous attempts therefore have already been made to control the evaporation of DDVP in a room so that it takes place quite gradually to maintain a concentration which is pesticidally effective, but nontoxic to humans, and simultaneously to protect the active compound against hydrolytic decomposition.

In regard to such attempts, German Auslegeschrift No. 1,207,144, column 1, lines 20 to 24, reads in essence:

"The production of long-lasting preparations is difficult, not only because of the high sensitivity to moisture of DDVP but also because of its incompatability with many carrier substances."

In the aforesaid German Auslegeschrift, it is further disclosed that the problem of long-lasting, uniform insecticidal effect cannot be solved with the aid of mixtures of DDVP and montan wax alone since no appreciable vaporization or evaporation of the active compound occurs. Even after 4 weeks' storage at room temperature, the content of active compound of such mixtures is practically the same, so that they cannot be used for the purpose sought. Hence, German Auslegeschrift No. 1,207,144 claims volatile agents having a long-lasting insecticidal effect which consist of a combination of DDVP as active compound, a montan wax and hydrogenated cottonseed oil or dibutylphthalate. These formulations, however, have the disadvantage that they exude a mixture of DDVP and plasticizer which understandably gives rise to toxicological problems.

An attempt has been made to soak natural products with DDVP. British Patent No. 1,072,218 claims a carrier for DDVP consisting of wood with a moisture content of less than 8 percent. The disadvantages of such a mode of application are obvious; natural products are never homogeneous in their structure. This is particularly true of a material with such a varying structure as wood. The differences between sapwood and heartwood and the structure of spring-wood laminae and summer-wood laminae are only two examples of this. From type to type, and even within one type of wood, these structural elements vary considerably, according to the environmental conditions under which a tree has grown. The expert knows how differently different pieces of wood behave when impregnated, one piece practically never resembling the other. To achieve a uniform evaporation of the active compound an individual dosage would therefore have to be worked out for each piece of wood.

The same considerations apply also in regard to a product on the market in which cuttlefish shell is used as carrier material for DDVP. This skeletal element of the cuttlefish, of which likewise no one piece is the same as another, suffers from the further disadvantage that it is not everywhere readily available in any desired amount. Natural products are therefore most unsuitable for the solution of the problem.

Furthermore, in German Auslegeschrift No. 1,230,250, shaped articles with persistent insecticidal effect are described which are characterized by the combination of a volatile, insecticidally effective organic phosphorus compound of specific composition and a thermoplastic, water-insoluble macromolecular substance, in particular polyvinyl chloride or copolymers which contain vinyl chloride.

As described in the above German Auslegeschrift No. 1,230,259, the absorbency of polyvinyl chloride for DDVP is limited, despite certain plasticizing properties of the phosphoric acid ester on the synthetic material. Thus, for example, mixtures of powdered polyvinyl chloride which contain 25 percent DDVP, are wet (see column 5, line 65, of German Auslegeschrift No. 1,230,259).

On the other hand, experiments showed that formulations of polyvinyl chloride and DDVP alone are not suitable as vaporizing agents, since, even after only a short time, they cease to give off sufficient active compound. To such mixtures, therefore, just as to the montan wax formulations described in German Auslegeschrift No. 1,207,144, considerable amounts of plasticizers have to be added. The dependence of the effect of DDVP-containing polyvinyl chloride formulations of the plasticizer content can be seen from the following Table 1 which relates to the duration of activity in respect of house flies (*Musca domestica*) of shaped articles of polyvinyl chloride containing 20 percent DDVP (size: 12×12.5×cm.) in relation to their plasticizer content, measured in a room of 50 cubic meters' size.

TABLE 1

| Plasticizer (dioctylphthalate) content in % | Duration in weeks of activity such that 50 % of the flies were killed within 24 hours |
|---|---|
| 5 | 2 |
| 10 | 4 |
| 20 | 10 |

As the above table shows, considerable amount of plasticizer are necessary for the shaped articles tested to have a sufficiently long-lasting insecticidal activity as solid vaporizing agents. If the plasticizer is lacking, or if not enough of it is present, the surface of the shaped article very rapidly becomes impoverished in active compound. Not enough DDVP migrates from the interior of the shaped article, so that it quickly becomes ineffective.

If, therefore, on the other hand the addition of considerable amounts of plasticizer is necessary, there results on the other hand the difficulty that this addition must take place at the expense of the content of active compound. Also, a formulation containing relatively large quantities of plasticizer and DDVP may have undesirable structural properties. Thus, for example shaped articles of polyvinyl chloride which contain 20 percent plasticizer and 18 percent DDVP exude during storage in gastight packs, and also in practical use, considerable amounts of a mixture of plasticizer and active compound. Because of the corrosiveness of this mixture and the toxicological considerations connected therewith, this behavior is very disadvantageous. Since polyvinyl chloride, on the other hand, is capable of absorbing only listed amounts of DDVP and plasticizer this disadvantage would be overcome only by reducing in the formulations either the protection of active compound or the proportion of plasticizer, or both at the same time. A lessening of the DDVP content would, however, impair the activity and a reduction of the proportion of plasticizer would affect adversely the diffusion of the active compound and thus also the effectiveness. For this reason, for shaped articles which consist of polyvinyl chloride, DDVP and plasticizer, it is recommended that in use they be accommodated in a cardboard frame which is to receive the undesirable dripping mixture of active compound and plasticizer.

A further disadvantage of the DDVP-polyvinyl chloride formulations must be seen in that, even when they contain the maximum of 20 percent plasticizer, a considerable part of the active compound does not reach the surface and is therefore wasted. Such shaped articles which have been used for 16 weeks under practical conditions and no longer possess a satisfactory biological activity still contain, by chemical analysis (infrared measurement after extraction), about 50 to 60 percent of their original DDVP content. This method of application therefore appears very uneconomical.

Finally, it must also be taken into account that, for the production of shaped articles of polyvinyl chloride plasticizer and DDVP a considerable amount in terms of equipment is necessary because the mixture has to be extruded, which presupposes the presence of suitable machinery. Moreover, since production takes place at high temperatures (170° to 180° C.), losses of the very volatile active compound occur which necessitate extensive protective measures for the workmen engaged in the manufacture.

In German Auslegeschrift No. 1,230,259, exclusively thermoplastic water-insoluble macromolecular substances are claimed as carrier materials, particular examples being: polymeric vinyl compounds, polyolefins, polyacrylates, polyvinylacetals, polyvinylidene compounds, and synthetic and natural elastomers, for example rubber and cellulosic synthetic materials. Examples of preferred vinyl compounds are polyvinyl halides, such as polyvinyl chloride and fluoride, polyacrylate esters and polymethacrylate esters, for example polymethylacrylate and polymethylmethacrylate; and polymeric benzene compounds, such as polystyrene and polymerized vinyltoluene. The polymers or copolymers of vinyl chloride are said to be particularly suitable and they allegedly exhibit, besides good physical properties, a very good compatibility with the insecticidal organic phosphorus compounds to be used.

In addition it is expressly emphasized in the said Auslegeschrift No. 1,230,259 that only with the use of a non-crosslinked material, that is, a thermoplastic material, is the desired effect achieved, namely the active compound is given off into the atmosphere in controlled amounts continuously and uniformly for months.

From Swiss Patent No. 289,915, too, it is learned that hardened shaped articles with active compounds worked into them, for example hardened products of phenolformaldehyde resins, soon stop exhibiting any useful insecticidally active vaporization. For one skilled in the art, the impression is clearly given that such thermosetting plastics are wholly unsuitable for such formulations.

These results published in the technical literature were confirmed by our own experiments, since it was not possible to attain, by the incorporation of DDVP into unsaturated polyester resins, a long-lasting insecticidally active vapor phase in shaped articles. The surface of such articles very rapidly becomes impoverished in active compound and, because of the cage effect of the three-dimensionally crosslinked thermosetting plastics, no, or too little, DDVP diffuses to the surface from the deeper layers. The result of this is that the shaped articles so produced possess no satisfactorily effect. Shaped articles as used herein comprise shaped bodies such as plates, spheres, strips, tablets or bars or any geometric solid (including hollow bodies).

It has now been found, in accordance with the present invention, that shaped articles, such as plates, spheres, strips, tablets or bars based on 0,0-dimethyl-0-(2,2-dichlorovinyl)-phosphoric acid ester (DDUP), incorporated in thermosetting resins produced from unsaturated polyesters and vinyl monomer compounds copolymerizable therewith, may now be provided which have a long term pesticidal vapor emission effect when the shaped articles contain solid fillers, optionally in combination with liquid fillers, and the weight ratio of active compound to the unsaturated polyester thermosetting resin is between about 1:4 to 2:1.

Furthermore, the instant shaped articles have considerable advantage over the formulations described in the literature based on thermoplastic compositions.

The present invention also provides a process for the production of shaped articles having a long term pesticidal vapor emission effect, in which a mixture of 0,0-dimethyl- 0-(2,2-dichlorovinyl)-phosphoric acid ester, as active compound, and an unsaturated polyester is copolymerized with a vinyl compound, the copolymer containing one or more solid fillers, the weight ratio of active compound to the resulting copolymer being from between about 1:4 to 2:1.

Suitable solid, e.g. inert, fillers usable according to the present invention are, for example: fibers of glass, sisal, hemp, nettles, coconut, flax and other vegetable products or synthetic fibers of the conventional type. Further examples of solid fillers are those of mineral nature, for example barium sulfate, titanium dioxide, iron oxides, kaolin, quartz, and other inert materials of the conventional type.

Suitable liquid, e.g. inert, fillers are those with carrier effect, for example dioctylphthalate, chloroparaffin or alkylsulfonic acid aryl ester, a.e. a mixture of $C_{10-18}$ alkylsulfonic acid phenyl esters.

It has proved particularly advantageous to use the aforesaid solid and liquid fillers in combination with one another.

The amount of the fillers must, as already mentioned, be such that the weight ratio of DDVP to the thermosetting plastic is between about 1:4 to 2:1, and preferably about 1:30 to 1:1, i.e. 0.25–2:1, and preferably 0.33–1:1.

It has been shown that thermosetting plastics in the aforesaid form, in particular unsaturated polyester resins, possess in accordance with the present invention the following advantages over thermoplastic compositions:

1. They have a better absorbency for DDVP (up to 50 percent);
2. Since they retain less active compound, there results a better quantitative utilization of the latter;
3. They possess a better activity;
4. The shaped article according to the invention do not drip;
5. The production of the shaped articles can take place at room temperature;
6. The production is possible to carry out merely by pouring the mass into simple molds consisting of any desired material, for example wood, without the use of machines;
7. The method of production according to the present invention renders possible the providing of a structure for the shaped articles in the form of layers with different DDVP and filler contents.

For the production of the formulations according to the invention, mixtures of unsaturated polyester thermosetting resins and DDVP are hardened according to methods customary for the processing of unsaturated polyesters resins with the aid of polymerization-initiating radicals (see example "I. Bjorksten et al.: Polyesters and their Application," Reinhold Publishing Corp., New York, 1959). Since losses of the readily volatile active compound may occur at higher temperatures, it is advantageous to use conventional initiator-accelerator systems effective even at room temperature, or high-energy rays such as ultraviolet or electron beams, for the conventional production of the polymerization-initiating radicals.

Of the initiator-accelerator systems effective at room temperature, the combinations consisting of a diacylperoxide, such as benzoyl peroxide, and a dialkylamine, for example dimethylaniline; or a ketone peroxide, such as methylethyl ketone peroxide or cyclohexanone peroxide, and a cobalt accelerator, such as cobalt naphthenate, resinate, octoate or acetylacetonate; can be used, but in the presence of DDVP a distinctly reduced speed of hardening is observed. On the other hand, initiator-accelerator systems consisting of a soluble vanadium compound, for example the vanadium salt of phosphoric acid dibutylester or a solution of vanadyl-p-tolune sulfonate, in butyl acetate containing .1 percent by weight of vanadium with peroxides attractive thereto, for example peresters, per-ketals, or alkyl-hydroperoxides, preferably cumene hydroperoxide, retain practically all of their effectiveness in the presence of DDVP and are therefore preferably used.

An advantageous form of application is also the working in of the DDVP into polyester foams which, for example, may be produced according to the methods described in French Pat. specification Nos. 1.535.795 and 1.535.796.

The instant articles may be regarded as crosslinked or hardened thermosetting, i.e. thermoset, resins produces from a copolymerized mixture of an unsaturated polyester, a vinyl monomer copolymerizable therewith, DDVP and a solid filter.

The hardening products on which the shaped articles of synthetic materials are based are the usual mixtures of unsaturated polyesters and monomeric vinyl compounds capable of being added thereto by polymerization, in the ration of 20:80 to 90:10 percent by weight.

The unsaturated polyesters are prepared in known manner by polycondensation of polyhydric, in particular dihydric, alcohols, e.g. lower dihydric alkanols, such as 1,2-propanediol, 1,3-butanediol or 2,2-dimethyl-1,3-propanediol, or polycondensation of lower dihydric alkanolmono- and di-lower alkyl ethers, such as di- or tri-ethyleneglycol, with $\alpha,\beta$-unsaturated dicarboxylic acids or anhydrides thereof, especially, $\alpha, \beta$-unsaturated lower alkandioic acids and anhydrides, for example, fumaric acid or maleic anhydride, optionally with addition of saturated dicarboxylic acids and anhydrides, especially lower, e.g. up to $C_8$, alkandioic acids and anhydrides, benzene dicarboxylic acids and anhydrides, etc., such as phthalic acid or its anhydrides, isophthalic, succinic, adipic, or sebacic acid.

The main physical characteristics of the unsaturated polyester resins are the following:

| | |
|---|---|
| viscosity at 20° C. (DIN 53015) | 600–12,000 Centipoise |
| density at 20° C. | 1,05–1,34 g./cm.³ |
| amount of thermal conductivity | 0,10–0,15 kcal./mh.° C. |
| specific heat | 0,30–0,50 cal./g.° C. |
| acid number | minor than 70 |
| OH-number | minor than 100 |
| molar weight of the unsaturated polyester | 800–5,000 |

Vinyl monomers which can be added in the usual way by polymerization are ethylenically unsaturated monomers, for example styrene, mono- and di-chlorostyrene, divinylbenzene, vinyltoluene; vinyl esters such as vinyl acetate and vinyl benzoate; acrylic esters and acrylonitrile; methacrylic acid esters; and allyl esters such as allyl acrylate, phthalic acid diallyl ester and triallyl phosphate.

Inhibitors which may be optionally concurrently used in the conventional way are, for example: quinone, hydroquinone, toluene hydroquinone, 2,5-di-tert.-butyl-quinone or 2,6-di-tert.-butyl-p-cresol.

Further suitable thermosetting plastics are, for example, conventional resins based on diisocyanate-modified polyethers or polyesters, epoxides, phenolformaldehyde and urea- or melamine-formaldehyde The shaped articles according to the present invention can be reason of their pesticidal activity be used for the control of the most diverse types of pests, such as insects and spiders.

The present invention also provides a method of combating insect or arachnid (including acarids and spiders) pests in a confined space (such as a room or cupboard) which comprises a situating or locating in the confined space a shaped article according to the present invention which emits a pesticidal vapor.

The following examples illustrate, without limitation, the production and long term vapor emission life of the shaped articles provided by the present invention, "parts" meaning parts by weight unless otherwise expressly stated.

The unsaturated polyester resins used as starting substances may be prepared in the conventional manner as follows:

Resin A: A polyester of an acid number of 44 prepared from 7,253 parts maleic anhydride, 43,883 parts phthalic anhydride, 29,267 parts 1,2-propanediol and 4.2 parts hydroquinone is dissolved in 28,000 styrene.

Resin B: The unsaturated polyester is prepared from 647 parts maleic anhydride, 2,284 parts phthalic anhydride, 1,276 parts 1,2-propanediol, 724 parts dipropyleneglycol (HO-$C_3H_6$-0-$C_3H_6$-OH) and 0.125 parts hydroquinone. After an acid number of 35 is reached, the product is dissolved in 1510 parts styrene.

Resin C: A polyester of an acid number of 31 prepared from 1294 parts maleic anhydride, 1598 parts phthalic anhydride, 986 parts 1,2-propanediol, 374 parts glycol, 636 parts diglycol (HOCH$_2$CH$_2$-O-CH$_2$-CH$_2$OH) and 0.72 parts hydroquinone is dissolved in 1910 parts styrene.

Example 1

Into a mixture of 1935 parts of polyester resin A (see above) and 774 parts DDVP are stirred successively 90 parts of a 40 percent solution of methylethylketone peroxide in dimethylphthalate and 30 parts of a cobalt octoate solution in dictylphthalate which contains 1 percent by weight of cobalt. From this mixture there is prepared in a closed mold a 5-mm. thick molded plate with a glass content of about 30 percent by weight, using a glass fiber mat of 450 g. weight per square meter. The plate is released from the mold after 2 hours and then cut into shaped articles of the size 12×12 cm. The test articles possess a dry and nontacky surface.

Example 2

1533 parts of unsaturated polyester resin B (see above) are intimately mixed with 851 parts DDVP, 596 parts dioctylphthalate, 90 parts of a 40 percent solution of methylethylketone peroxide in dimethylphthalate and 30 parts of a cobalt octoate solution in dioctylphthalate which contains 1 percent cobalt. Using a glass fiber plate of density 450 g./m.², there is prepared from this mixture in a closed mold a 5 -mm. thick molded plate with a glass content of about 30 percent by weight. After 24 hours, the plate with nontacky, dry surface is taken out of the mold and cut into test pieces of the dimensions 12×12 cm.

Example 2a (comparative test)

800 parts of the unsaturated polyester resin A (for penetration, see above) and 200 parts DDVP are well mixed. The mixture is then catalyzed with 30 parts of a 40 percent solution of methylethylketone peroxide in dimethylphthalate and 10 parts of a cobalt octoate solution in dioctylphthalate which contains 1 percent cobalt, and from this mixture a 5-5-mm. thick molded plate is produced in a closed mold. After 24 hours the plate is released from the mold and cut into test pieces of the dimensions 12×12 cm. which feel dry to the touch.

EXAMPLE 3

A a plate produced according to example 2a (comparative test) as well as, in each case, one of the plates obtained according to Examples 1 and 2 are suspended individually in the middle of rooms of equal size of 50 cubic meters volume and, in each case, 2,000 house flies (*Musca domestica*) were exposed to it. Observation is undertaken to see whether all the flies have been killed in the course of 24 hours or not. The tests are repeated at an interval of 1 week in each case until a 100 percent destruction of the flies within 24 hours is no longer observed. The lasting effect of the plate resulting therefrom can be seen from the following table 2:

TABLE 2

| Shaped articles according to Example | Duration of activity in weeks |
|---|---|
| 1 | 9 to 10 |
| 2 | 13 to 14 |
| 2a (comparative Test) | 1 to 2 |

EXAMPLE 4

Into a mixture of 225 parts of polyester resin A (for preparation, see above) and 75 parts DDVP are stirred successively 9 parts of a 40 percent solution of methylethylketone peroxide in dimethylphthalate, and 3 parts of a cobalt octoate solution in dioctylphthalate which contains 1 percent cobalt. From this mixture there is produced in a closed mold, with the use of a glass fiber mat of 450 percent weight per square meter, a 5-mm. thick molded plate with a glass content of about 30 percent by weight. The plate, the surface of which is free from tackiness, is released from the mold after 2 hours, then tempered at 40° C. for 4 hours in a gastight container and cut into shaped articles of the size 12×12 cm.

EXAMPLE 5

66.5 parts polyester resin B (for preparation, see above) and 3.5 parts DDVP are intimately mixed with 1.75 parts of a 40 percent solution of methylethylketone peroxide in dimethylphthalate and 0.7 parts of a cobalt octoate solution in dioctylphthalate which contains 1 percent by weight cobalt. From the mixture obtained there is produced, using a glass fiber mat of 450 g. weight per square meter, a 1-mm. thick molded plate with a glass content of about 30 percent by weight. After slight gelling, there is laminated onto both sides of this molded plate, a further 1-mm. thick plate which likewise contains about 30 percent by weight of glass fiber mat, but also 10 percent by weight DDVP. Finally, after slight gelling of these layers, there is again applied to the upper and lower surface in each case a further 1-mm. thick layer with a DDVP content of 50 percent by weight and a glass fiber mat content of about 30 percent by weight and the external surfaces of the test piece are covered with cellophane film. After hardening and removal of the film, the surface of the shaped article is free from tackiness and is dry.

EXAMPLE 6

Various preparations produced according to Examples 4 and 5 are individually suspended in the middle of rooms of equal size of 50 cubic meters volume and exposed in the later to, in each case, 1,000 house flies (*Musca domestica*). The time is then observed as to when 50 percent of the flies have been filled ($LT_{50}$). At specific intervals of time, which can be seen from the following table 3, flies are again released in the test rooms and the tests are evaluated in the same manner as previously. Between the individual experiments, the rooms are aired adequately.

TABLE 3

| Preparation according to Example | Occurrence of $LT_{50}$ in the case of *Musca domestica* (in hours) after the hanging up of the shaped articles for— | | | | |
|---|---|---|---|---|---|
| | 0 wk. | 1 wk. | 4 wks. | 6 wks. | 10 wks. |
| 4 | 1 | 2 | 2 | 2.5 | 3 |
| 5 | 1.5 | 2 | 3 | 3.5 | 5 |

EXAMPLE 7

45 parts of unsaturated polyester resin A (for preparation, see above) and 25 parts DDVP are very well mixed with 30 parts barium sulfate, 2.1 parts of a 40 percent solution of methylethylketone peroxide in dimethylphalate and 0.7 of a cobalt octoate solution in diocthylphthalate which contains 1 percent cobalt. The mixture is poured into a mold which consists of 2 glass plates of the dimensions 20×20×0.3 cm. which internally are kept at a distance of 5 mm. by a plastic tube. After 24 hours, the molded plate is released. The surface of the shaped article is free from tackiness and is dry.

EXAMPLE 8

45 parts unsaturated polyester resin A (for preparation, see above) and 25 parts DDVP are ground with 30 parts of most finely ground, readily dispersible rutile (i.e. crude $TiO_2$), 0.7 parts cumene hydroperoxide and 0.7 parts of an accelerator solution which contains 1 percent by weight of vanadium. The mixture is hardened at room temperature in the mold described in example 7. When released after about 2 hours, a plate with a surface which is free from tackiness and which is dry is obtained.

EXAMPLE 9

225 parts of polyester resin C (for preparation see above), 125 parts DDVP, 1.7 parts cumene hydroperoxide and 2.0 parts of an accelerator solution which contains 1 percent vanadium are intimately mixed. From this mixture there is produced in a closed wooden mold, with the use of glass staple fibers of 6 mm. length, a 5-mm. thick molded plate with a glass content of about 30 percent by weight. The plate is released after 2 hours with a nontacky and dry surface.

EXAMPLE 10

80 parts of polyester resin C (for preparation, see above) are intimately mixed with 20 parts chloroparaffin (70 percent by weight chlorine), 40 parts DDVP, 1.4 parts cumene hydroperoxide and 1.4 parts accelerator solution which contains 1 percent vanadium. Using a glass fiber mat of surface density 450 g. per square meter there is produced in a closed wooden mold a 5-mm. thick molded plate with a glass content of about 30 percent by weight and the plate is removed form the mold after 24 hours with a surface free from tackiness and which is dry. During suspension for 3 months in a closed room, no drip formation is observed.

EXAMPLE 11

A plate produced according to example 2 as well as one in accordance with the prior art and consisting of polyvinyl chloride which contains 20 percent plasticizer and 18 percent DDVP are freely suspended for 16 weeks in a room and the DDVP content is then determined analytically (infrared method after extraction). The plate according to example 2 had given off to the atmosphere 71 percent of its original DDVP content, whereas the comparative plate of polyvinyl chloride had given off only 35.5 percent of its original DDVP content.

It will be appreciated that the instant specification and examples are set forth by way of illustration and not limitation, and that various modifications and changes may be made without departing from the spirit and scope of the present invention.

What is claimed is:

1. Shaped article molded into the form of plates, spheres, strips, tablets, bars or hollow bodies and having a long term pesticidal vapor emission effect which consists essentially of (a) a cross-linked or hardened thermosetting resin produced from an unsaturated polyester and a vinyl monomer copolymerizable therewith, and a containing a pesticidally effective amount of (b) 0,0-dimethyl-0-(2,2-dichlorovinyl)-phosphoric acid ester, as effective compound, and (c) as a solid filler therein an effective amount of member selected from the group consisting of glass fibers, sisal, hemp, nettles, coconut, flax, synthetic fibers, barium sulfate, titanium dioxide, iron oxides, kaolin and quartz, said active compound being present in a ratio by weight to the resin of between about 0.25–2:1, said molded shaped article having been produced by curing the uncured form of (a) together with (b), (c) and a conventional polymerization initiating and accelerating system effective for curing (a) under conditions which avoid high temperature loss of the readily volatile active ingredient (b), (c) providing a long term pesticidal vapor emission effect to the surface of such shaped molded cross-linked thermosetting plastic article, the surfaces of which otherwise become very rapidly impoverished with little or no (b) diffusion to the surface from the deeper layers.

2. Article according to claim 1 wherein said ratio by weight is between about 0.33–1:1.

3. Article according to claim 1 wherein a mixture of inert solid fillers is present.

4. Article according to claim 1 wherein at least one inert liquid filler is also present.

5. Article according to claim 1 wherein said unsaturated polyester and vinyl monomer are present in a ratio by weight of between about 20:80 to 90:10.

6. Article according to claim 1 wherein said unsaturated polyester is prepared by the polycondensation of a polyhydric alcohol with a member selected from the group consisting of $\alpha,\beta$-unsaturated dicarboxylic acids and anhydrides thereof.

7. Article according to claim 1 wherein said unsaturated polyester is prepared by the polycondensation of maleic anhydride, phthalic anhydride, and 1,2-propane-diol in the presence of hydroquinone, and is copolymerized with styrene as vinyl monomer.

8. Article according to claim 7 wherein said unsaturated polyester is prepared by the polycondensation of maleic anhydride, phthalic anhydride, 1,2-propane-diol, and dipropylene glycol in the presence of hydroquinone, and is copolymerized with styrene as vinyl monomer.

9. Article according to claim 7 wherein said unsaturated polyester is prepared by the polycondensation of maleic anhydride, phthalic anhydride, 1,2-propane-diol, glycol, and diglycol in the presence of hydroquinone, and is copolymerized with styrene as vinyl monomer.

UNITED STATES PATENT OFFICE
CERTIFICATE OF CORRECTION

Patent No. __3608062__     Dated __September 21, 1971__

Inventor(s) __Franz Alfes et al__

It is certified that error appears in the above-identified patent and that said Letters Patent are hereby corrected as shown below:

Col. 2, line 21

"1,230,250" should be -- 1,230,259 --;

line 28

"described" should be -- disclosed --;

line 47

"12 x 12.5 xcm" should be -- 12 x 12.5 x 0.5 cm --;

line 63

"amount" should be -- amounts --.

Col. 4, line 13

"DDUP" should be -- DDVP --;

line 48

"1 : 30" should be -- 1 : 3 --;

line 59

"article" should be -- articles --;

line 73

"polyesters" should be -- polyester --.

UNITED STATES PATENT OFFICE
CERTIFICATE OF CORRECTION

Patent No. __3608062__      Dated __September 21, 1971__

Inventor(s) __Franz Alfes et al__      PAGE - 2

It is certified that error appears in the above-identified patent and that said Letters Patent are hereby corrected as shown below:

Col. 5, line 1

"1959" should be -- 1956 --;

line 17

"tolune" should be -- toluene --;

line 18

".1" should be -- 1 --;

line 28

"produces" should be -- produced -- line 54 (in the Table)

"1,05-1,34" should be -- 1.05-1.34 --;

line 55 (in the Table)

"0,10-0,15" should be -- 0.10-0.15 --;

line 56 (in the Table)

"0,30-0,50" should be -- 0.30-0.50 --

Col. 6, line 4

"be" should be -- by --

UNITED STATES PATENT OFFICE
CERTIFICATE OF CORRECTION

Patent No. 3608062      Dated September 21, 1971

Inventor(s) Franz Alfes et al      PAGE - 3

It is certified that error appears in the above-identified patent and that said Letters Patent are hereby corrected as shown below:

Col. 6, line 9

Delete "a" (first occurrence)

Col. 7, line 36

"450 percent" should be -- 450 g --;

line 68

"later" should be -- latter --;

Col. 8, line 15

"dimethylphalate" should be -- dimethylphthalate --

Column 9, ### line 9 after "of" insert -- a --

Signed and sealed this 9th day of May 1972.

(SEAL)
Attest:

EDWARD M. FLETCHER, JR.
Attesting Officer

ROBERT GOTTSCHALK
Commissioner of Patents